Feb. 27, 1940.　　　F. R. CATALDO　　　2,191,751
AUTOMOTIVE VEHICLE GUARD
Filed Dec. 3, 1938
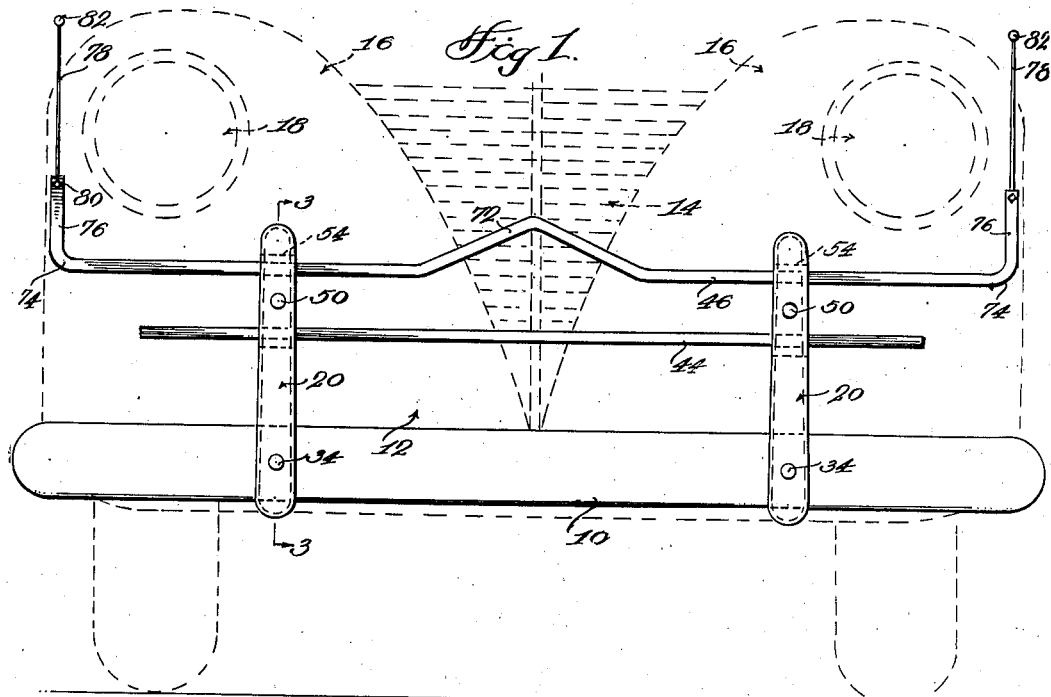
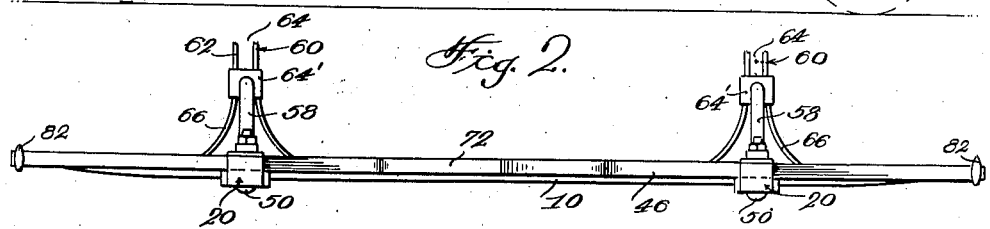
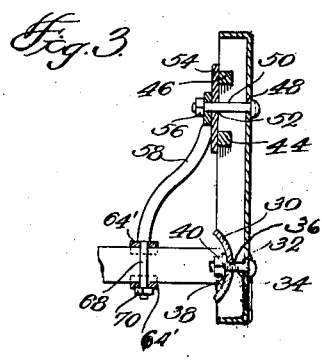
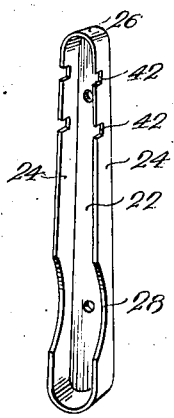
Fred R. Cataldo
INVENTOR
BY Victor J. Evans & Co.
ATTORNEYS Patented Feb. 27, 1940

2,191,751

UNITED STATES PATENT OFFICE 2,191,751

AUTOMOTIVE VEHICLE GUARD

Fred R. Cataldo, Chelsea, Mass.

Application December 3, 1938, Serial No. 243,859

3 Claims. (Cl. 293—55)

My invention relates to automotive vehicles, and has among its objects and advantages the provision of an improved guard which may be attached to the front bumper bar for protecting the grill and fenders of the automobile.

In the accompanying drawing:

Figure 1 is an elevational view of the front bumper illustrating my invention applied thereto;

Figure 2 is a top plan view;

Figure 3 is a sectional view along the line 3—3 of Figure 1; and

Figure 4 is a perspective view of a portion of the device.

In the embodiment selected to illustrate my invention, I make use of the front bumper bar 10 of an automobile indicated generally at 12. The grill of the automobile is indicated generally at 14, the fenders at 16 and the head lamps in the fenders at 18.

To the bumper bar 10 I connect two vertical bars 20, each of which includes a plate 22 and flanges 24 interconnected by curvatures 26 for ornamental purposes. According to Figure 4, the flanges 24 are provided with recesses 28 curved to conform to the outer contour 30 of the bumper bar 10. Bars 20 are identical in construction.

Figure 3 illustrates the bar 20 as being provided with an opening 32 for the reception of a bolt 34 extending through an opening 36 in the bumper bar 10. Bolt 36 is provided with a washer 38 and a nut 40 threaded thereto for clamping the bar 20 to the bumper bar 10 through tightening of the bolt 34.

Figures 3 and 4 illustrate the bar 20 as being provided with spaced recesses 42 and 44 within which are positioned bars 44 and 46, respectively. Both bars are rectangular in cross section and fit snugly inside their respective recesses, as illustrated in Figure 3.

Referring to Figure 3, the bar 20 is provided with an opening 48 for the reception of a bolt 50 extending through an opening 52 in a plate 54 which spans the two bars 44 and 46. The bolt is provided with a nut 56, between which nut and the plate 54 is positioned the upper end of a diagonal brace member 58 which is bored for the reception of the bolt 50. Thus tightening of the bolt 50 will clamp the bars 44 and 46 into connected relation with the bar 20, in addition to securing the upper end of the diagonal brace 58. Plate 54 is restrained from relative shifting in that the bolt 50 passes therethrough.

Each bar 20 is provided with one diagonal brace 58. Bumper bar 10 is connected with two supports 60 in the usual manner. Each support 60 comprises two bars 62 spaced at 64 and curved outwardly, as at 66. To each of the supports 60 adjacent the curvature 66 I mount two short channels 64', with the flanges of the channels extending partly over the outer faces of the bars 62. The diagonal braces 58 have shanks 68 passing through openings in the channel members 64' and serve for the reception of nuts 70 through the medium of which the channel members are fixedly clamped to the bars 62 for anchoring the lower ends of the diagonal braces 58. Thus it seems that the bars 20 are effectively anchored to the bumper bar 10 in addition to being supported in an upright position through the medium of the diagonal braces 58.

Bar 46 is bent intermediate its ends to provide an inverted U-shaped configuration 72 located directly in front of the grill 14. Both bars 44 and 46 afford protection for the grill 14, while the bend 72 affords protection for the grill a considerable distance upwardly of the same, in addition to lending an element of ornamentation to the bar.

Bar 46 is considerably longer than the bar 44 and is bent upwardly at 74 to provide vertical runs 76 positioned substantially flush with the vertical planes defined by the outer edges of the fenders 16. Each reach 76 is provided with a bore for the reception of a fender guide 78 having its lower end positioned in the bore and fixedly secured by a set screw 80. Each fender guide rod 78 is provided with a ball 82 at its upper end.

Bars 44 and 46 in combination with the bars 20 and the bumper bar 10 afford protection for the fenders 16. Head lights 18 are also protected against damage as an incident to the protection afforded the fenders 16. Bar 46 constitutes a mount for the fender guides 78. At the same time, the bars 44 and 46 provide effective protection for the grill 14. Bars 20 are easily attached to bumper bars of conventional construction.

Shanks 68 of the diagonal braces 58 are each located between the associated bars 62, while the flanges of the channel members 64 restrain the channel as well as the diagonal braces 58 from lateral displacement. Bars 44 and 46 may be finished in such a color as to enhance the ornamental aspects of the structure and to harmonize appropriately with the color scheme of the vehicle trim.

Without further elaboration, the foregoing will so fully illustrate my invention that others may, by applying current knowledge readily adapt the same for use under various conditions of service.

I claim:

1. In combination with the bumper structure of an automotive vehicle including fenders and a grill, upright members bolted to the bumper structure, horizontal bars bolted to the upright members, said horizontal bars being spaced vertically and one of the bars being provided with a bend located in advance of the grill, the latter bar having vertical reaches, fender guides projecting upwardly from said vertical reaches, diagonal brace means cooperable on said upright members of the bumper structure for supporting the former, said upright members being recessed, said horizontal bars being positioned in said recesses, plates spanning said horizontal bars, and bolts extending through the upright members, said plates and said diagonal brace means for connecting these parts into a unitary structure.

2. In combination with the bumper structure of an automotive vehicle including fenders and a grill, upright members bolted to the bumper structure, horizontal bars bolted to the upright members, said horizontal bars being spaced vertically and one of the bars being provided with a bend located in advance of the grill, the latter bar having vertical reaches, fender guides projecting upwardly from said vertical reaches, diagonal brace means cooperable on said upright members of the bumper structure for supporting the former, said upright members being recessed, said horizontal bars being positioned in said recesses, plates spanning said horizontal bars, bolts extending through the upright members, said plates and said diagonal brace means for connecting the parts into a unitary structure, said upright members being channel-shaped in cross section, and having recesses for housing the bumper structure.

3. In combination with the bumper structure of an automotive vehicle including fenders and a grill, upright members bolted to the bumper structure, horizontal bars bolted to the upright members, said horizontal bars being spaced vertically and one of said bars being provided with a bend located in advance of the grill, diagonal brace means cooperable on said upright members and the bumper structure for supporting the upright members, said upright members being recessed, said horizontal bars being positioned in said recesses, plates spanning said horizontal bars, bolts extending through the upright members, said plates and said diagonal brace means for connecting the parts into a unitary structure, said upright members being channel-shaped in cross section and having recesses for housing the bumper structure engaged thereby.

FRED R. CATALDO.